US006996674B2

(12) United States Patent
Chiu et al.

(10) Patent No.: US 6,996,674 B2
(45) Date of Patent: Feb. 7, 2006

(54) METHOD AND APPARATUS FOR A GLOBAL CACHE DIRECTORY IN A STORAGE CLUSTER

(75) Inventors: Lawrence Yium-chee Chiu, Cupertino, CA (US); Windsor Wee Sun Hsu, Sunnyvale, CA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 09/851,452

(22) Filed: May 7, 2001

(65) Prior Publication Data

US 2003/0028819 A1 Feb. 6, 2003

(51) Int. Cl.
*G06F 12/00* (2006.01)

(52) U.S. Cl. ....................... 711/118; 711/113; 711/118; 711/119; 711/120; 711/122; 711/137; 711/141; 709/9; 709/201; 709/203; 709/218; 709/219; 709/224; 709/236

(58) Field of Classification Search ................ 711/100, 711/114, 118, 152, 154, 162; 709/203, 216–232, 709/9, 201, 236–238
See application file for complete search history.

(56) References Cited

U.S. PATENT DOCUMENTS

| | | | | |
|---|---|---|---|---|
| 5,768,623 | A * | 6/1998 | Judd et al. | 710/37 |
| 5,787,470 | A * | 7/1998 | DeSimone et al. | 711/124 |
| 5,926,180 | A * | 7/1999 | Shimamura | 345/739 |
| 6,035,415 | A * | 3/2000 | Fleming | 714/11 |
| 6,073,218 | A * | 6/2000 | DeKoning et al. | 711/150 |
| 6,167,490 | A | 12/2000 | Levy et al. | |
| 6,178,519 | B1 * | 1/2001 | Tucker | 714/4 |
| 6,182,111 | B1 * | 1/2001 | Inohara et al. | 709/201 |
| 6,609,213 | B1 * | 8/2003 | Nguyen et al. | 714/4 |
| 2002/0133537 | A1 * | 9/2002 | Lau et al. | 709/203 |

OTHER PUBLICATIONS

E. Omiccinski et al., "Performance Analysis of a Concurrent File Reorganization Algorithm for Record Clustericg," 1994, IEEE Transactions on Knowledge and Data Engineering, 6(2):248-257.

E. Omiccinski et al., "Concurrent File Reorganization for Record Clustering A Performance Study," 1992, IEEE, pp. 265-272.

F.E. Bassow, IBM AIX Parallel I/O File System: Installation, Administration, and Use. IBM, Kingston, 1995. Document No. SH34-6065-02.

R. Bennett et al., "Jovian: A Framework for Optimizing Parallel I/O," 1994, IEEE Computer Society Press, pp. 10-20.

(Continued)

*Primary Examiner*—Donald Sparks
*Assistant Examiner*—Hashem Farrokh
(74) *Attorney, Agent, or Firm*—Gates & Cooper LLP

(57) ABSTRACT

A method, apparatus, and article of manufacture provide the ability to maintain cache in a clustered environment. The cache is maintained in both a primary and secondary node. When data is requested, a symbolic list in a cache directory is examined to determine which node's cache contains the requested data. If the symbolic list indicates data is not currently in cache of any node, any node may be used as the secondary node. However, if an original primary node maintains the data in cache, the original primary node is selected as the secondary node. Once a new write I/O operation is performed, the symbolic list is updated to provide. To install a new node, after applying for cluster admission, symbolic information and a modified track list is requested. The modified track list is merged with new symbolic entries and the new node then broadcasts its availability to the cluster.

28 Claims, 4 Drawing Sheets

100
102 HOST
102 HOST
104 HOST STORAGE AREA NETWORK
106 STORAGE NODE CACHE 114
108 INTERNODE STORAGE NODE NETWORK
106 STORAGE NODE CACHE 114
112 DEVICE STORAGE AREA NETWORK
110 DISK
110 DISK

OTHER PUBLICATIONS

P.F. Corbett et al., "The Vesta Parallel File System," 1996, ACM Transactions on Computer Systems, 14(3):225-264.

J. Huber et al., "PPFS: A High Performance Portable Parallel File System," 1995, In Proc. of the 9th ACM Int'l Conf. on Supercomputing, ACM Press, pp. 385-394.

D. Kotz et al., "Caching and Writeback Policies in Parallel File Systems," 1991, IEEE Symp. on Parallel Distributed Processing, pp. 60-67.

S. Moyer et al., "PIOUS: A Scalable Parallel I/O System for Distributed Computing Environments," 1994, In Proc. of the Scalable High-Performance Computing Conference, pp. 71-78.

W. Ng et al., "The systematic improvement of fault tolerance in the Rio file cache," 1999, In Proc. of 1999 Symposium on Fault-Tolerant Computing, 1999, pp. 76-83.

N. Nieutwejaar et al., "The Gallery parallel file system," 1997, Parallel Computing, pp. 1-35.

B. Nitzberg, "Performance of the iPSC/860 Concurrent File System," 1992, Technical Report RND-92-020, NAS Systems Division, NASA Assoc Research Center.

N. Peyrouze, et al., "An efficient fault-tolerant NFS server designed for off-the-shelf workstations," 1996, IEEE Proceeding of 1996 Symp on Fault-Tolerant Computing, pp. 64-73.

P. Pierce, "A concurrent File System for a Highly Parallel Mass Storage Subsystem," 1989, In. Proc. of the Fourth Conf. on Hypercube Concurrent Computers and Applications, pp. 155-160.

A. Purakayastha et al., "ENWRICH: A compute-processor write caching scheme for parallel file systems," 1996, ACM Press In Proc. of the Fourth Workshop on Input/Output in Parallel and Distributed Systems, pp. 55-68.

K.E. Seamons et al., "Server-Directed Collective I/O in Panda," 1995, In Proc. of Supercomputing, IEEE, pp. 1-14.

R. Thakur et al., "Passion: Optimized I/O for Parallel Applications," 1996, IEEE Computer, 29(6):70-78.

* cited by examiner

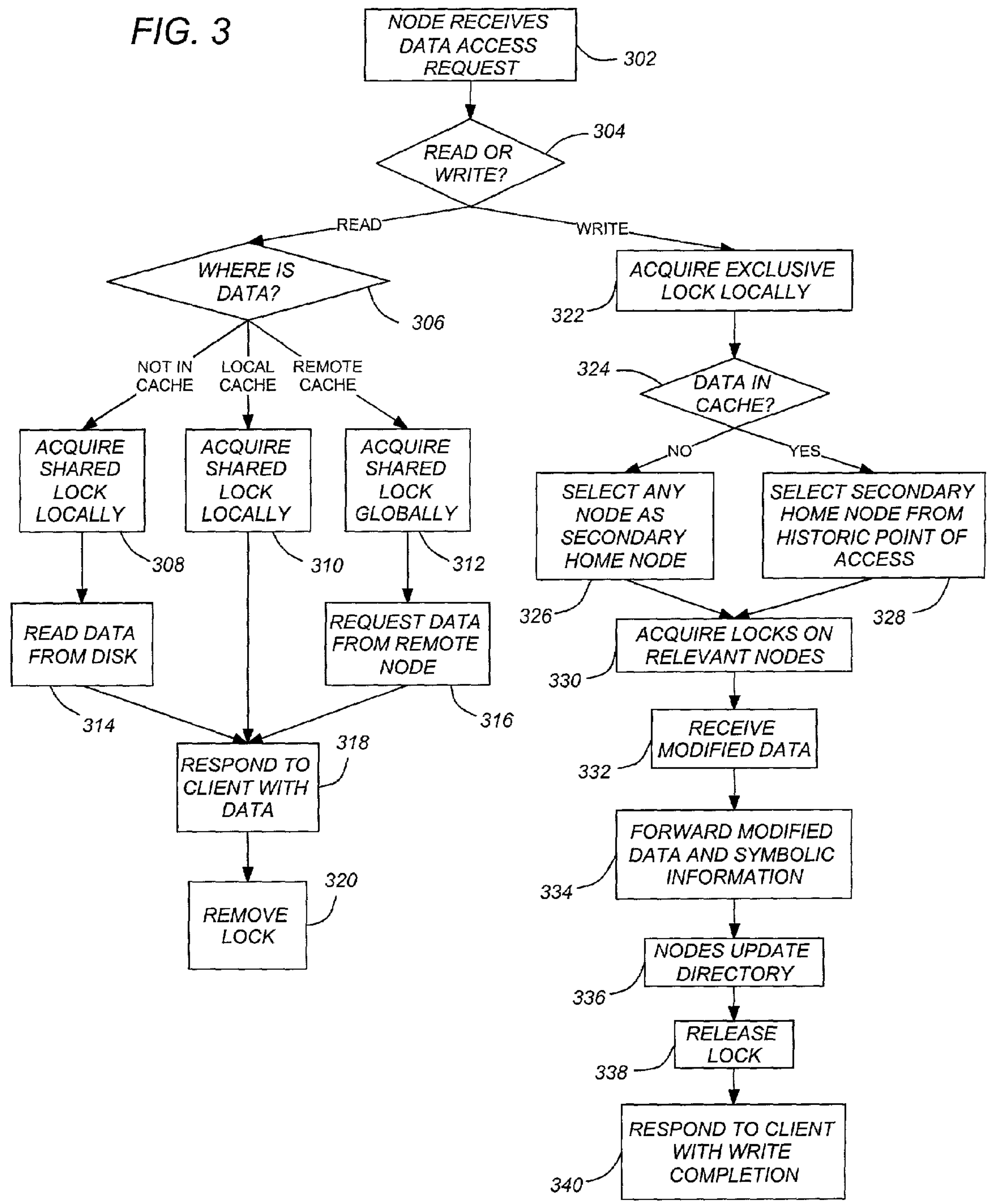
FIG. 3
NODE RECEIVES DATA ACCESS REQUEST
302
READ OR WRITE?
304
READ
WRITE
WHERE IS DATA?
306
NOT IN CACHE
LOCAL CACHE
REMOTE CACHE
ACQUIRE SHARED LOCK LOCALLY
308
ACQUIRE SHARED LOCK LOCALLY
310
ACQUIRE SHARED LOCK GLOBALLY
312
READ DATA FROM DISK
314
REQUEST DATA FROM REMOTE NODE
316
RESPOND TO CLIENT WITH DATA
318
REMOVE LOCK
320
ACQUIRE EXCLUSIVE LOCK LOCALLY
322
DATA IN CACHE?
324
NO
YES
SELECT ANY NODE AS SECONDARY HOME NODE
326
SELECT SECONDARY HOME NODE FROM HISTORIC POINT OF ACCESS
328
ACQUIRE LOCKS ON RELEVANT NODES
330
RECEIVE MODIFIED DATA
332
FORWARD MODIFIED DATA AND SYMBOLIC INFORMATION
334
NODES UPDATE DIRECTORY
336
RELEASE LOCK
338
RESPOND TO CLIENT WITH WRITE COMPLETION
340

METHOD AND APPARATUS FOR A GLOBAL CACHE DIRECTORY IN A STORAGE CLUSTER

CROSS-REFERENCE TO RELATED APPLICATIONS

This application is related to the following commonly assigned patent applications, which applications are incorporated by reference herein:

U.S. patent application Ser. No. 09/755,858, METHOD AND APPARATUS FOR SUPPORTING PARITY PROTECTED RAID IN A CLUSTERED ENVIRONMENT", by Lawrence Yium-chee Chiu et. al., filed on Jan. 5, 2001;

U.S. patent application Ser. No. 09/851,468 filed on May 7, 2001 now U.S. Pat. No. 6,587,921 issued on Jul. 1, 2003 herewith, entitled "METHOD AND APPARATUS FOR CACHE SYNCHRONIZATION IN A CLUSTERED ENVIRONMENT", by Lawrence Yium-chee Chiu et. al., and U.S. patent application Ser. No. 09/851,014 filed on May 7, 2001 now U.S. Pat. No. 6,675,264 issued on Jul. 6, 2004 herewith, entitled "METHOD AND APPARATUS FOR IMPROVING WRITE PERFORMANCE IN A CLUSTER-BASED FILE SYSTEM", by Ying Chen et. al.

BACKGROUND OF THE INVENTION

1. Field of the Invention

The present invention relates to data storage systems, and in particular, to a method and apparatus for utilizing a number of cache storage nodes in a cluster storage subsystem.

2. Description of the Related Art

The ability to manage massive amounts of information in large scale databases has become of increasing importance in recent years. Increasingly, data analysts are faced with ever larger data sets, some of which measure in gigabytes or even terabytes. To access the large amount of data, two or more systems that work together may be clustered. Clustering generally refers to multiple computer systems or nodes (that comprise a central processing unit (CPU), memory, and adapter) that are linked together in order to handle variable workloads or to provide continued operation in the event one computer system or node fails. Each node in a cluster may be a multiprocessor system itself. For example, a cluster of four nodes, each with four CPUs, would provide a total of 16 CPUs processing simultaneously. Practical applications of clustering include unsupervised classification and taxonomy generation, nearest neighbor searching, scientific discovery, vector quantization, time series analysis, multidimensional visualization, and text analysis and navigation.

In a clustered environment, the data may be distributed across multiple nodes that communicate with each other. Clustering in such a storage system provides a way to bundle throughput from multiple nodes to serve a single or multiple clients. Each node maintains a data storage device, processor, etc. to manage and access a portion of the data. However, such a distributed system requires a mechanism for managing the data across the system and communicating between the nodes.

In order to increase data delivery and access for the nodes, cache may be utilized. Cache provides a mechanism to store frequently used data in a location that is more quickly accessed. Cache speeds up data transfer and may be either temporary or permanent. Memory and disk caches are utilized in most computers to speed up instruction execution and data retrieval, and to provide low read/write latency and potentially better throughput than read/write to disk. These temporary caches serve as staging areas, and their contents can be changed in seconds or milliseconds. Cache in storage nodes usually improves read performance by predictively reading ahead and improves write performance by DASD fastwrite. The host initiated write operation is completed as long as the data is in a storage node's cache. The write data is later grouped together and flushed to disk as a delayed operation.

In the prior art, a mainframe or centralized storage model provides for a single global cache for a storage cluster. Such a model provides a single pipeline into a disk drive. Having data in one central location is easier to manage. However, to share data stored in a centralized location, multiple copies of the data must be made. Multiple copies of write data in the cluster are made to guarantee write data is not lost after one hardware failure, such as node failure. Also, multiple copies of unmodified data may reside in different nodes to provide good access locality.

In another prior art model, the disk is separated from its controller and a storage area network (SAN) is utilized to store the global cache. In a SAN, a back-end network connects multiple storage devices via peripheral channels such as SCSI (small computer system interface), SSA (serial storage architecture), ESCON (enterprise systems connection), Fibre Channel, Infiniband, and iSCSI (SCSI over IP). A centralized SAN ties multiple nodes into a single storage system that may be a RAID (redundant array of independent devices) device with large amounts of cache and redundant power supplies. A centralized storage topology, wherein data is stored in one central location, is commonly employed to tie a server cluster together for failover. In addition, some storage systems can copy data for testing, routine backup, and transfer between databases without burdening the hosts they serve.

In a decentralized SAN, multiple hosts are connected to multiple storage systems to create a distributed system.

In both decentralized and centralized SAN systems, nodes can be added, and data can be scaled and managed better because the data does not have to be replicated.

Typically, in the prior art, there are two nodes in SAN storage products. Such storage products are referred to as "active-passive"—one node in the storage product is active and one is passive. When utilizing a passive node, there is no input/output (I/O) operations between the nodes unless requested (i.e., the node is passive). Such a request is primarily invoked when there is an error on the node the user is currently communicating with and recovery is required. Further, I/O can only occur in one direction—up/down the active channel. Such one way communication results in the inability to share information. Thus, with an active-passive storage product, the lack of active bi-directional communication between the nodes slows performance.

Storage subsystems, such as a storage cluster, are widely used to serve "shared" data in an enterprise computing environment that has high performance, fault tolerance, and storage capacity requirements. As described above, in a prior art clustered environment, one or more nodes are used to access data. However, the lack of active communication between nodes in prior art systems limit potential performance of the system. Accordingly, what is needed is a storage system and method for moving data closer to a most frequently accessed communication point to increase probable data delivery performance and to provide acceptable performance, fault tolerance, and storage capacity.

SUMMARY OF THE INVENTION

To address the requirements described above, the present invention discloses a method, apparatus, article of manufacture, and a memory structure for an inter-node network. Nodes are active-active using commodity hardware, so that the system can perform I/O together between any number of nodes, and data can be located on any given node. A single modified image is configured to maintain recent and updated data. At least one failure can occur (and be corrected) in the nodes before data is written to disk.

A history of access points is kept in a cache directory, and it is assumed that the nodes most frequently accessed in the past are likely to be the most frequently accessed in the near future. One or more embodiments of the invention move this data to where it will likely be needed. This means that data is delivered to hosts quickly, as is required in high volume enterprise web environments.

The symbolic list in the cache directory provides a history of the nodes that have previously I/O opertions. When data is requested, embodiments of the invention look at the symbolic list to determine which node's cache contains the requested data. Primary and secondary node are utilized for storing cache. The node that receives the request for modifying data is identified as a primary node. If the symbolic list indicates that the data is not currently in the cache of any node in the storge cluster, any node in the storage cluster may be selected as the secondary node. Alternatively, if the sybolic list indicates that an original primary node in the storage cluster maintains the data in cache, the original primary node is selected as the secondary node. Once a new write I/O opertion is performed, the symbolic list is updated to provide for the new I/O opertion.

Additionally, embodiments of the invention provide Fast write support, fault tolerance support, and concurrent node installation support. For example, to install a new node, the new node first applies for cluster admission. The new node then requests the symbolic information for new write requests and requests a modified track list comprising an identifier of modified data and an associated symbolic entry. The new node merges the modified track list with any new symbolic entries and then broadcasts availability to remaining node in the storage cluster.

BRIEF DESCRIPTION OF THE DRAWINGS

Referring now to the drawings in which like reference numbers represent corresponding parts throughout:

FIG. 3 is a flow chart illustrating the processing of requests for data in accordance with one or mote embodiments of the invention.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A simple way to address cache blocks distributed across different nodes is through a global cache directory scheme. One or more embodiments of the invention utilize a global cache directory maintained in multiple nodes in a storage cluster environment. A historic point of access list is maintained in a symbolic list of each entry in the cache directory. When an I/O operation is requested, the symbolic list is accessed to determine which node's cache contains the data. Further, upon the completion of an I/O operation, the symbolic list is updated. To provide fault tolerance in the event of a node hardware failure, modified data may be maintained in the cache of two or more nodes. Since the symbolic list provides the historic points of access (and thereby the location of data in cache), the list aids in the fault recovery process. Embodiments of the invention also provide Fast write support and concurrent node installation support.

Hardware Environment

Figure 1:
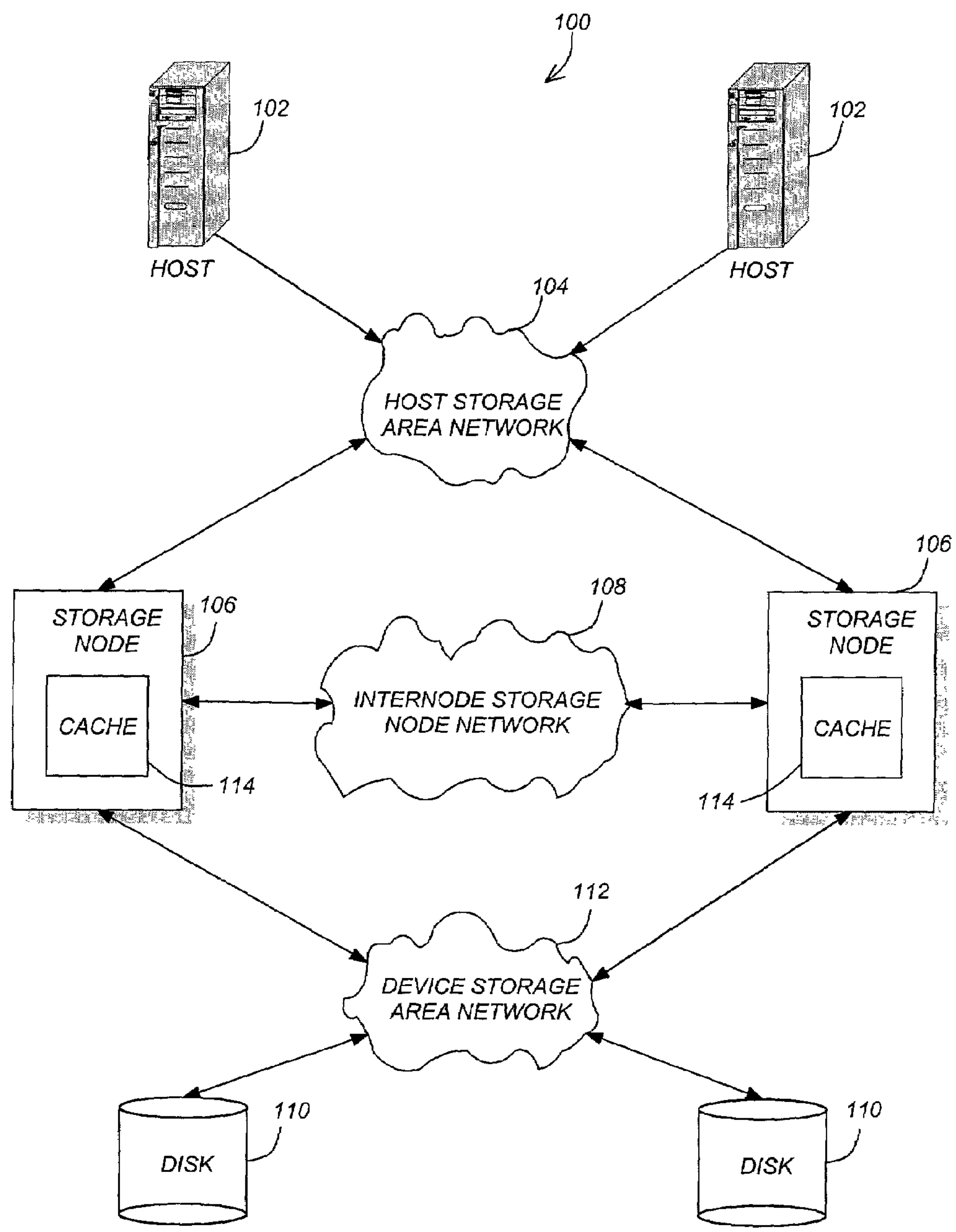
FIG. 1 is a block diagram showing a hardware environment in accordance with one or more embodiments of the invention.

FIG. 1 is a block diagram showing a hardware environment in accordance with one or more embodiments of the invention. A cluster storage subsystem 100 is comprised of one or more hosts 102 in a host storage area network 104, a number of cache storage nodes 106 in an internode storage network 108, and one or more storage disks 110 in a device storage area network 112. Each storage node 106 comprises a large cache 114, a set of adapters that communicate across the host storage area network 104 between hosts 102, and shared devices. The hosts 102, nodes 106, and disks 110 can be interconnected to other devices via a local area network, wide area network, internet, or other means of providing communications.

In the preferred embodiment, the hosts 102, nodes 106, and disks 110 each include one or more processors that execute the logic necessary to accomplish the present invention. This logic may be stored in memory, loaded from a fixed or removable data storage device, or accessible from some other device across the host storage area network 104, the internode storage network 108, the device storage area network 112, or some other communications medium.

Global Cache Directory Scheme

Cache blocks 114 are distributed across and shared among the various nodes 106 in a system 100. A simple way to address cache blocks 114 distributed across the different nodes 106 is through a global cache directory scheme. Such a scheme falls into a classic Distributed Shared Memory (DSM) architecture. Additional elements (beyond a standard DSM architecture) may be required for a high-end storage subsystem 100. One requirement is for a multiple reader/single writer protocol. Typical subsystems 100 provide multiple reader/single writer protocol for shared data wherein multiple writes ate serialized by hosts 102 and not by the subsystem 100 itself. A second requirement is for a high locality of reference. When a host 102 requests I/O from a specific storage node 106, the host 102 is likely to request similar I/O from the same storage node 106 the next time. A third requirement is that of fault tolerance. To maintain fault tolerance, a cluster should not contain a single point of failure.

Figure 2:
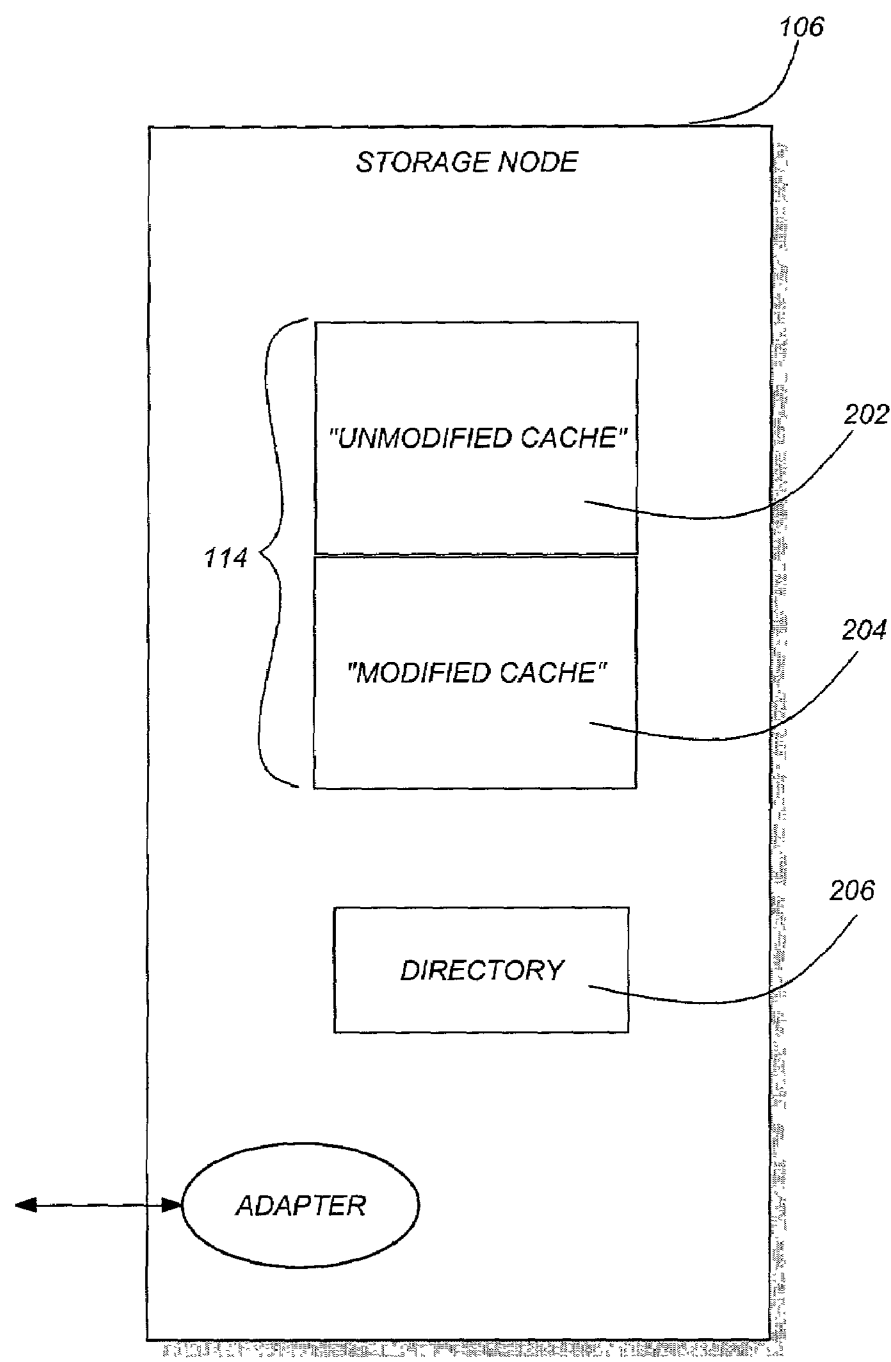
FIG. 2 illustrates the details of a storage node in accordance with one or more embodiments of the invention.

To accommodate the above requirements, one or more embodiments of the invention utilize a cache directory as illustrated in FIG. 2. A cache directory 206 is stored within each storage node 106. Separate methods/schemes are utilized to manage "modified" cache 204 directory entries and "unmodified" cache 202 directory entries. Each storage node 106 manages unmodified cache data 202 independently. For unmodified cache data 202, each entry in cache directory 206 contains information that points to a local copy of the data 202 or a symbolic link that points to a remote copy.

Once a node 106 has modified cache data 204, cache directory 206 entries must be updated. Each storage node 106 manages "modified" cache data 204 cooperatively. At least two identical copies (a primary copy and a secondary copy) of the modified cache data 204 reside in different storage nodes 106, which are called "HOME" nodes 106. The rest of the cluster nodes 106 (that do not contain actual copies of the cache data 204), are referred to as "REMOTE" nodes 106 and must contain a symbolic link in its associated cache directory 206 entries pointing to the "HOME" node 106. The modified data 204 replication (i.e., in the different primary and secondary HOME nodes 106) can sustain at least one storage node 106 failure, and still can continue to maintain a complete, correct and coherent cache directory 206.

Each entry in directory 206 contains a symbolic link that identifies the cache location 114 for each piece of data in subsystem 100. The symbolic link identifies the addresses of the "primary" and "secondary" HOME nodes 106. REMOTE nodes 106 are not contained within the symbolic link. Primary nodes 106 receive the original write requests and secondary nodes 106 contain the backup copy of the modified data 204.

The symbolic link also serves as the history for points of access to the data 204. The first entry in a symbolic link is the primary HOME node 106 and the entries thereafter are the secondary HOME nodes 106. For example, the symbolic link "S(N1,N2,N3, . . . )" means the primary HOME node of the modified data 204 is node N1 106, and the secondary HOME nodes that contain backup copies of the data are N2, N3, . . .

The selection of secondary HOME nodes 106 is based on the history of the points of access. For example, in the symbolic link "S(N1,N2,N3, . . . )", N1 is the current primary HOME address. If the point of access is changed from N1 to N3, the primary HOME node 106 is assigned to N3 and the secondary HOME node 106 is assigned to N1. Hence, the final symbolic link is "S(N3,N1,N2, . . . ). The reason to adjust the primary and secondary nodes 106 (that are reflected in the symbolic link) is to dynamically replicate data towards the point of access based on the historical access pattern.

To ensure the accuracy of the data and prevent access conflicts, a distributed locking mechanism is utilized to serialize all accesses to modified data 204 directory 206 entries. With either a read or write request, a lock for accessed data is held as long as the transaction is active. For example, when a node 106 receives a write request, a global exclusive lock is applied to protect the update to the cache 204 entries across different nodes 106. The lock prevents other nodes 106 from performing a read or write request to the shared tracks. Also, whenever a node 106 receives a read request for the modified data 204, a global sharing lock is applied such that readers are permitted access and any writers are serialized across all of the storage nodes 106. Accordingly, the locking mechanism implements a policy of "multiple readers, single writer".

For each storage node 106, an uninterruptible power supply (UPS) is used to provide proper protection against power outages. Each UPS is configured with enough power to sustain a power outage for a single node 106 to destage modified data 204 in cache 114 at any time. Destaging is the process of reading data from cache 114. Alternatively, destaging is the action of storing a logical data unit in cache memory 114 with active write data to the storage device 110; as a result, the logical data unit changes from cached active write data to cached read data.

A reliable interconnect 108 is used between storage nodes 106. The reliability can be ensured by redundancy of the adapter cards and cables.

The storage cluster global cache directory 206 of the invention provides many advantages. For example, the directory 206 supports a global cache directory scheme for sharing data in a cluster. Modified data 204 is replicated for fault tolerance in a subset of cluster nodes 106 and the rest of the cluster receives symbolic information. Unmodified data 202 may exist in many nodes 106 according to different points of access. The directory 206 also supports a cache algorithm that moves the data to the points of access to optimize the high locality of reference. Further, fast write operations are enabled without any special hardware. Additionally, the directory 206 sustains multiple node 106 failures with the ability to re-balance the workload to remaining nodes 106.

Cache Directory Structure

The directory 206 is organized as an array of entries, each of which contains either a local or a remote location of the cache data 114. Table 1 illustrates the information contained within each entry.

TABLE 1

| NAME | SYMBOL | DESCRIPTION |
|---|---|---|
| Remote / Local | R/L | Indicates if the cache entry is pointing to a remote or a local location. |
| Modified / Unmodified | M/U | Indicates if the cache entry is pointing to modified data or unmodified data. |
| Primary / Secondary | P/S | Indicates if the current node is the primary HOME or secondary HOME node. |
| Symbolic Link | S(Nx, Ny, Nz,...) | An address points to the HOME node of the data. It contains all of the primary and secondary addresses and preserves the order of point of access to the data for write request. |
| Local Address | Addr | A physical address where the cache data is in. |

Accordingly, each entry in the directory 206 identifies whether the cache entry is remote or local, modified or unmodified, and a primary or secondary node 106. Further, each entry contains a symbolic link and a physical address for the location of the data.

Table 2 tabulates all of the possible states of the combination of a cache entry. The assumptions in Table 2 are that node X is the primary HOME node, node Y is the secondary HOME node, node Z is a remote node, D1 is modified data, and D2 is unmodified data.

TABLE 2

| CACHE ENTRY IN NODE | DESCRIPTION | R/L | M/U | P/S | S(x,y) | Addr |
|---|---|---|---|---|---|---|
| X | D1 in node X | L | M | P | S(x,y) | xxxx |
| Y | D1 in node Y | L | M | S | S(x,y) | yyyy |
| Z | D1 in node Z, Z does not contain a local copy of D1 | R | M | — | S(x,y) | — |

TABLE 2-continued

| CACHE ENTRY IN NODE | DESCRIPTION | R/L | M/U | P/S | S(x,y) | Addr |
|---|---|---|---|---|---|---|
| Z | D1 in node Z, Z contains a local copy of D1 | L | M | — | S(x,y) | zzzz |
| X/Y/Z | D2 in node X, Y, or Z | L | U | — | — | Xxxx or yyyy or zzzz |

Examining Table 2, the first tow indicates that a cache entry in node X refers to local modified data in node X wherein node X is the primary HOME node.

The second row indicates that a cache entry in node Y refers to local modified data in node Y wherein node Y is the secondary node. By examining the symbolic link, row two indicates that the primary node for the data is in node X.

Row three indicates that a cache entry in node Z refers to modified data in node Z that is not maintained locally. Accordingly, the symbolic link in tow three indicates that the primary node is node X, and the secondary node is node Y. No address is listed for the data because the data is not maintained locally.

Row four indicates that a cache entry in node Z refers to modified data in node Z that is maintained locally. However, since Z is a remote node, the symbolic link indicates that nodes X and Y are the HOME nodes. Nonetheless, since a copy is maintained locally, the address "zzzz" is listed in the cache entry.

Row five indicates that a cache entry in node X, Y, or Z refers to unmodified data in node X, Y, or Z that is maintained locally. Since the data is unmodified, any node can access the data without any resulting problems, and a history for the unmodified data does not need to be maintained in a symbolic list. Since the data is maintained locally, the address for the location of the data (i.e., "xxxx", "yyyy", or "zzzz") is provided in the cache entry.

Cache Coherence Protocol

FIG. 3 is a flow chart illustrating the processing of requests for data in accordance with one or more embodiments of the invention. At step 302, a node 106 receives a request for access to data from a client or host 102. At step 304, a determination is made regarding whether or not the request is to read or write data. If the request is to read data, the process continues at step 306 with a determination of where the requested data is located. If the data is not in cache 114 (i.e., a cache 114 miss occurs), the node 106 acquires a shared lock on the associated track locally at step 308 and reads the data from disk into local cache 114 at step 314. If the data is located in local cache 114 (i.e., a local cache 114 hit), at step 310, node 106 merely acquires a shared lock on the associated track locally (since node 106 has access to the data locally). However, if the data is located in a remote node's 106 cache 114, the node 106 acquires a shared lock on the associated track globally (i.e., on the nodes 106 that contain the relevant cache 114) at step 312 and requests the data from the remote node 106 at step 316.

Once the relevant data is in the node's 106 local cache 114, the node 106 responds to the client with the data at step 318. At step 320, the node 106 removes the shared lock (on either the local track or global track depending on the lock obtained).

If at step 304, the request is for writing data, the process continues at step 322 where the exclusive lock is obtained for the associated local track. Steps 324–328 provide for the selection of a secondary HOME node(s) 106 for the modified data. Since data is being modified/written by the node 106 that has received the request, the client/host 102 is the primary HOME node 106. Accordingly, only the secondary HOME nodes must be selected in steps 324–328.

At step 324, a determination is made regarding whether or not the data is in cache 114 (either locally or remotely). If the data is not in local cache 114 (i.e., there is no history for point of access (referred to as a cache write miss)), any node 106 can be selected as the secondary HOME node 106, at step 326.

However, if the data is already in cache 114, the historic point of access in the symbolic link is examined to select the secondary HOME node 106. For example, if the symbolic link indicates that the same node 106 that has received the request is already the primary HOME node 106, there is no need to select a new secondary HOME node 106. Alternatively, if the symbolic link indicates that a different node 106 was the original primary HOME node 106, the original primary HOME node 106 becomes the secondary HOME node 106 and the current node 106 (the node 106 that has received the request from the client) becomes the primary HOME node 106. Additionally, if the symbolic link indicates that another node 106 was the original secondary HOME node 106, the original secondary HOME node 106 becomes the REMOTE node 106.

Once the primary and secondary HOME nodes 106, and the REMOTE node 106 have been selected, the primary HOME node 106 requests an exclusive lock on the relevant tracks on all relevant nodes 106 in the cluster at step 330. In other words, a lock is acquired such that the relevant data may not be read or written from any node 106 that contains the relevant data (i.e., the other HOME nodes 106). Once acquired, node 106 receives the modified data from the client 102 at step 332. At step 334, the relevant data is forwarded to the other primary HOME nodes 106 and the symbolic information is forwarded to any REMOTE nodes 106. Once received the data remains in the node's 106 cache 114.

At step 336, the nodes 106 update the cache 114 directory appropriately. Once the relevant nodes 106 respond with a success status for updating the directory 206, the primary HOME node 106 releases the lock for all of the nodes 106 at step 338. At step 340, node 106 responds to the client acknowledging that the original write operation is complete.

As described with respect to FIG. 3, cache 114 is stored and accessed in accordance with a specific cache 114 coherence protocol that utilizes a cache directory 206. In order to take advantage of high locality of reference, the cache directory 206 selects the secondary HOME node 106 according to the I/O access pattern stored in the symbolic link. For example, if host 102 writes shared data through node 1 and node 2 repeatedly, cache 114 management naturally arranges node 1 and node 2 as the primary and secondary HOME nodes 106 for the shared data. Also if host 102 writes data through node 1 and reads data through node 2, cache 114 management also arranges node 1 as the primary HOME node 106 and node 2 as the secondary HOME node 106 for the shared data as the access pattern is established. This protocol eliminates unnecessary data forwarding between nodes 106 upon data access.

SAMPLE CACHE OPERATIONS

In accordance with the protocol of FIG. 3, the following examples illustrate the processing of cache 114 and the cache directory 206 of the invention. In the examples, it is assumed that node X is the primary HOME node, node Y is the secondary HOME node, and Z is the REMOTE node.

Write Miss Operation

In a write miss operation, the data for an attempted write operation is not located in the cache 114 of any node 106. At step 302, node X receives a write request. At step 322, X locks the associated track locally. At step 326, X picks a set of secondary HOME node(s) for the modified data. For purposes of illustration, assume that Y is the secondary HOME node and Y is the REMOTE node. As described above, if the corresponding data has no history for point of access, any node 106 can be selected as the secondary HOME node. Otherwise, the secondary HOME node is selected according to the historic point of access.

At step 330, X requests locking the track remotely in all of the nodes 106 in the cluster. After the track is locked in all of the nodes 106 in the cluster, X receives modified data from the client 102 at step 332. At step 334, X forwards the modified data to Y and concurrently sends symbolic information to Z. After Y and Z respond with success status from updating the directory 206 at step 336, X releases the global lock to all the nodes 106 at step 338. X responds to the client with the original write completion status at step 340.

The final state of the cache 114 entries in all of the different nodes 106 after the above write miss is provided in Table 3.

TABLE 3

| OPERATION | NODE X | | | | NODE Y | | | | NODE Z | | | |
|---|---|---|---|---|---|---|---|---|---|---|---|---|
| Write (X) | L | M | P | S(xy) | L | M | S | S(xy) | R | M | — | S(xy) |

Table 3 indicates that node X is a local primary HOME node containing modified data with a symbolic link of S(xy). Table 4 further indicates that node Y is a local secondary HOME node containing modified data with the same symbolic link S(xy). Node Z is a REMOTE home node that contains the same symbolic link that points to the modified data in node X and node Y.

Remote Write Hit for Modified Data Operation

In a remote write hit for modified data operation, the data is located in the cache 114 of a node 106 other than the node 116 that has received the write request. In this example, assume that X is the primary HOME node and Y is the secondary HOME node prior to receiving the write request.

At step 302, node Z receives a write request. At step 322, Z acquires an exclusive lock to the associated track locally. At step 328, Z picks a set of secondary HOME node(s) for the modified data. Since X is the original primary node, X is the secondary HOME node and Y is the REMOTE node. At step 330, Z requests exclusive locking the track remotely in all of the nodes 106 in the cluster. After the track is locked in all of the nodes 106 in the cluster, Z receives the modified data from the client at step 332. At step 334, Z forwards the modified data to X and concurrently sends symbolic information to Y. After X and Y respond with a success status from updating the directory at step 336, Z releases the global exclusive lock to all of the nodes 106 at step 338. At step 340, Z responds to the client 102 with the write completion status.

The final state of the cache 114 entries in all of the different nodes 106 after the remote write hit is provided in Table 4.

TABLE 4

| OPERATION | NODE X | | | | NODE Y | | | | NODE Z | | | |
|---|---|---|---|---|---|---|---|---|---|---|---|---|
| Write (Z) | L | M | S | S(zx) | R | M | — | S(zx) | L | M | P | S(zx) |

Table 4 indicates that node Z is the primary HOME node containing modified data in local cache. Table 4 further indicates that node X is the secondary HOME node containing modified data in local cache and that node Y is the REMOTE node and does not have data in local cache.

Cache Miss Read Operation

In a cache miss read operation, a node 106 receives a request to read data that is not stored in cache 114 on any node 106. At step 302, node X receives a read request. At step 308, X acquires a shared lock on the associated track locally. At step 314, X reads the data from disk into the local track 114. At step 318, X responds to the client with the data. At step 320, X removes the shared lock on the track.

The final state of the cache 114 entries in all of the different nodes 106 after the read cache miss operation is illustrated in Table 5.

TABLE 5

| OPERATION | NODE X | | | | NODE Y | NODE Z |
|---|---|---|---|---|---|---|
| Read (X) | L | U | — | — | | |

Table 5 indicates that node X contains a local copy of unmodified data in cache.

Local Cache Hit for Unmodified Data Read Operation

In a local cache hit for unmodified data operation, a read is requested for unmodified data located in local cache. At step 302, node X receives a read request. At step 310, X acquires a shared lock on the associated track locally. At step 318, X responds to the client 102 with the data from cache 202. At step 320, X removes the shared lock on the track.

The final state of the cache entries in all of the different nodes 106 after the local cache hit for unmodified data read operation is illustrated in Table 6.

TABLE 6

| OPERATION | NODE X | | | | NODE Y | NODE Z |
|---|---|---|---|---|---|---|
| Read (X) | L | U | — | — | | |

Table 6 indicates that node X contains a local copy of unmodified data in cache.

Remote Cache Hit for Modified Data Read Operation

In a remote cache 114 hit for modified data 204 read operation, a client 102 issues a request to read modified data that is located in cache on node 106 other than the node 106 that has received the read request. At step 302, node Z receives a read request. At step 312, Z acquires a shared lock on the associated track globally. At step 316, Z requests the data from the node that contains the data (i.e., node X). At step 318, Z responds to the client 102 with the data. At step 320, Z removes the shared lock on the track globally.

The final state of the cache entries in all of the different nodes 106 after the remote cache hit for unmodified data operation is illustrated in Table 7.

Fault Tolerant Support

As described above, one or more embodiments of the invention provide fault tolerance support. For example, when one node 106 detects another node 106 failure, the detected node 106 broadcasts a "failover recovery" message to all of the remaining nodes 106. A the beginning of the failover recovery process, each node 106 updates the topology of the remaining cluster and continues to scan all its modified cache 204 entries to identify any single HOME modified data 204 concurrently. Each node 106 decides either to destage the modified data to disk 110 or to replicate the single HOME data to another node 106. Replication of single HOME data to another node 106 is faster than destaging single HOME data. Such a scheme can minimize the probability of another node 106 failure during the failover recovery process. However, since there is less cache space available in the cluster, there is a need to maintain a lower modified cache threshold in the system and therefore a set of single home tracks will be destaged to achieve this goal.

TABLE 7

| OPERATION | NODE X | | | | NODE Y | | | | NODE Z | | | |
|---|---|---|---|---|---|---|---|---|---|---|---|---|
| Read (Z) | L | M | P | S(xy) | L | M | S | S(xy) | L | M | — | S(xy) |

Table 7 indicates that node X is the primary HOME node and contains modified data in local cache. Table 7 also indicates that node Y is the secondary HOME node and contains modified data in local cache. Further, node Z is a REMOTE node that also contains modified data in local cache.

ADDITIONAL SUPPORT FEATURES

Fast Write Support with Commodity Parts

One or more embodiments of the invention may provide support for Fast write operations with commodity parts. A Fast write operation is a write operation that utilizes the "Fast" asynchronous communications protocol that quickly transmits files over high-quality lines. Fast writes are widely utilized in enterprise level storage subsystems to improve write latency while properly considering fault tolerance. In a Fast write, all write operations are considered completed on disk as long as the subsystem guarantees that the modified data can destage to the disk 110 in the event of a failure such as a warmboot or power outage. Fast writes ate usually implemented by maintaining an additional copy of modified data in non-volatile storage (NVS), which usually has a high cost-capacity ratio.

The cache directory 206 scheme maintains at least two copies of modified data distributed across different storage nodes 106. The inter-connect 108 between nodes 106 is configured to sustain at least a gigabit of throughput to provide a reasonable performance to substitute the PCI peripheral component interconnect) based NVS card. Currently, three commodity technologies, Fibre Channel, Gigabit Ethernet, and Inifiniband, provide such bandwidth. With the help of the uninterruptable power supply support in each node 106 and proper inter-connect technology, the cache 114 management can sustain at least one storage node 106 failure and can still destage all of the modified data 204 to the disk 110.

The cache 114 architecture can sustain multiple node 106 failures and continue to maintain full fault tolerance and completeness of the directory 206, with the assumption that one node 106 fails at a time. During the failover recovery process, all of the remaining nodes 106 continue to accept I/O requests and any reference in the symbolic link to the failed node 106 is substituted by the remaining HOME node 106 or a new node 106 selected from the cluster. The remaining nodes 106 naturally re-balance the workload and modified cache data 204 across themselves. Upon completion of the failover recovery process, the directory 206 continues to maintain at least two (2) copies of the modified data 204. For the same reason, the cluster can sustain another failure.

In the case of only one node 106 remaining in the cluster that has not failed, the single node 106 cluster transitions into a write through node 106, from which any write request will be immediately destaged without being cached.

Concurrent Node Installation Support

Concurrent node 106 installation is required in many high-end scalable storage subsystems to upgrade the performance and storage capacity of the cluster while the subsystem continues to operate with little impact in performance and functionality. The concurrent node 106 installation process also provides the same path for a concurrent failback operation.

Figure 4:
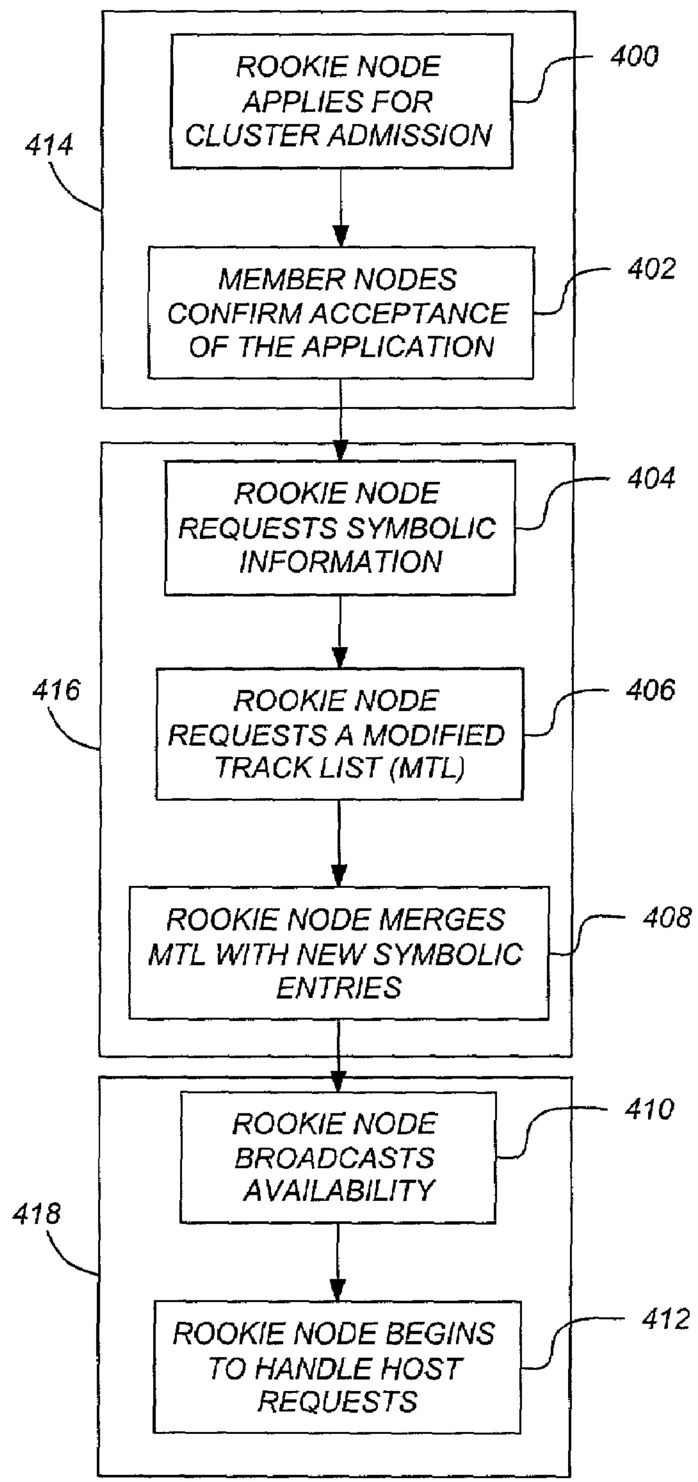
FIG. 4 is a flow chart illustrating the concurrent node installation process in accordance with one or mote embodiments of the invention.

Because of simplicity, the concurrent node 106 installation process only supports adding one node 106 to the cluster at a time. If there are multiple nodes 106 that need to be added to the cluster, a selection process determines which node 106 will be added to the cluster first. The new node 106 or the failback node 106, which is also called a rookie node (Rn) 106, requires completing three major phases, application, orientation, and operation before it is part of the cluster. FIG. 4 is a flow chart illustrating these three major phases in accordance with one or more embodiments of the invention.

During the application stage 414, the rookie node 106 is applying for cluster admission. In the application stage 414, it is assumed that rookie node 106 does not handle any new requests from host 102 and has already obtained the topology of the cluster. Accordingly, the rookie node 106 broadcasts a message to all member nodes 106 in the cluster to apply for cluster admission at step 400. All member nodes 106 send confirmation to the rookie node 106 that once the application is accepted at step 402.

During the orientation stage 416, rookie node 106 becomes oriented with the other nodes 106 in the cluster and the existing symbolic lists. Accordingly, at step 404, the rookie node 106 requests each member to start forwarding the entire cache 114 symbolic information for all new write requests. All member nodes 106 acknowledge the request with a response to the rookie node 106.

At step 406, the rookie node 106 requests each member to send over a modified track list (MTL) that comprises an identifier of the modified data 204 and the associated symbolic entry. The list may only include information or completed Fast write transactions. The rookie node 106 can either request the whole list from one member node 106 or request a partial list from every node 106 to compile the whole list. At step 408, the rookie node 106 merges the MTL with any new symbolic entries from the beginning of the orientation phase. The merges guarantee that the rookie node 106 contains the up-to-date copy of all modified data 204 in the cluster.

During operation phase 418, the rookie node 106 may begin being utilized as a HOME or REMOTE node 106. At step 410, rookie node 106 broadcasts its availability to all member nodes 106. Thereafter, all member nodes 106 can select the rookie node 106 as the secondary HOME node. Thus, at step 412, the rookie node 106 begins to handle host 102 requests for I/O.

The rookie node 106 is the only initiator and coordinator of the concurrent node 106 installation process. This provides a single point of control to ease implementation and debugging effort and also reduces any impact in performance from any member node 106 in the cluster.

CONCLUSION

This concludes the description of one or more embodiments of the invention. In summary, the invention describes a method, apparatus, article of manufacture, and a memory structure for utilizing a cache directory 206 to manage a global cache 114 among nodes 106 in a storage cluster. Embodiments also provide for Fast write support, fault tolerant support, and concurrent node installation support. Embodiments of the invention handle multiple nodes 106 without utilizing special hardware.

The model of the invention provides for "active-active" nodes 106, using commodity hardware, so the system can perform I/O operations together between any number of nodes 106, and data can be located anywhere. There is only a single modified image maintained, i.e., to keep updated data. At least one failure can occur (and be corrected) in the nodes 106 before data gets written to disk 110. A history of access points is kept in a symbolic list (that may contain the last two nodes 106 accessed). The symbolic list keeps a host 102 access pattern optimized, i.e., the nodes 106 most frequently accessed in the past are probably going to be most frequently accessed in the future too. The invention therefore moves data to where it will likely be needed. Moving data in this manner provides the ability to deliver data to hosts quickly, as is required in high volume enterprise web environments.

Nodes 106 and hosts 102 can be made by different companies, as long as they follow the same protocol. Data is moved closer to a host 102 (point of access) for faster access to the data. Additionally, embodiments may be utilized for fibre channel, where disks 110 have multiport capability.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of maintaining cache in a clustered environment comprising:

(a) receiving an I/O request, for modifying data, in a primary node of a storage cluster of two or more nodes;

(b) storing die modified data in cache of the primary node;

(c) selecting a secondary node for storing the modified data in the secondary node's cache based on a historic point of access list maintained in a cache directory, wherein;

(i) the historic point of access list identifies which node's cache contains which data;

(ii) the historic point of access indicates that the data is not currently in cache of any node of the storage cluster; and (iii) die secondary node selected is any node in the storage cluster;

(d) forwarding the modified data and symbolic information to one or more relevant nodes in the storage cluster, wherein the symbolic information identifies the primary and secondary nodes as containing the modified data; and (e) updating the historic point of access list based on the symbolic information.

2. The method of claim 1 wherein the request is to write data.

3. The method of claim 1 wherein:

the symbolic information includes information relating to the first node; and the historic point of access list is updated by:

listing the first node as the primary node; and listing the secondary node as the secondary node.

4. The method of claim 1 further comprising selecting a remote node that is an original secondary node in the historic point of access list maintained in the cache directory.

5. The method of claim 1 wherein:

a copy of the modified data is maintained in the first node and the secondary node; and the symbolic information is maintained in remaining nodes of the storage cluster.

6. The method of claim 1 further comprising acquiring a lock on associated tracks on nodes in the storage cluster wherein the locking protocol provides for multiple readers and a single writer.

7. The method of claim 1 further comprising:

detecting a failure of a node in the storage cluster;

broadcasting a failover recovery message to all nodes in the storage cluster; and replicating the data from the primary node or the secondary node to another node in the storage cluster.

8. The method of claim 1 further comprising:

detecting a failure of a node in the storage cluster;

broadcasting a failover recovery message to all nodes in the storage cluster; and destaging the data from the primary node or the secondary node to disk.

9. The method of claim 1 further comprising:

applying for cluster admission;

requesting the symbolic information far new write requests;

requesting a modified track list comprising an identifier of modified data and an associated symbolic entry;

merging the modified tack list with any new symbolic entries; and broadcasting availability to remaining nodes in the storage cluster.

10. An apparatus for maintaining cache in a clustered environment comprising;

(a) a cache;

(b) a cache directory comprising a historic point of access list for the cache, wherein the historic point of access list identifies which node's cache contains which data;

(c) a storage node organized in a storage cluster and having an interface for connecting to a host, a storage disk, and one or more additional storage nodes, wherein the storage node maintains cache and the cache directory, and wherein the storage node is configured to:

(i) receive an I/O request for modifying data;

(ii) store the modified data in the cache of the storage node;

(iii) select a secondary node for storing data in the secondary node's cache based on the historic point of access list;

(iv) forward the modified data and symbolic information to one or more additional storage nodes in the storage cluster, wherein the symbolic information identifies a primary node and the secondary node as containing the modified data; and (v) update the historic point of access list based on the symbolic information (d) a new node configured to:

(i) apply for cluster admission;

(ii) request the symbolic information for new write requests;

(iii) request a modified track list comprising an identifier of modified data and an associated symbolic entry;

(iv) merge the modified track list with any new symbolic entries; and (v) broadcast availability to remaining nodes in the storage cluster.

11. The apparatus of claim 10 wherein the I/O request is to write data.

12. The apparatus of claim 10 wherein:

the historic point of access indicates that the data is not currently in cache of the nodes in the storage cluster; and the secondary node selected is any node in the storage cluster.

13. The apparatus of claim 10 wherein:

the historic point of access indicates that an original primary node maintains the data in cache; and the secondary node selected is the original primary node.

14. The apparatus of claim 10 wherein:

the symbolic information includes information relating to a first node that receives the request; and the historic point of access list is updated by:

listing the first node as the primary node; and listing the secondary node as the secondary node.

15. The apparatus of claim 10, wherein the storage node is further configured to select a remote node that is an original secondary node in the historic point of access list maintained in rite cache directory.

16. The apparatus of claim 10 wherein:

a copy of the modified data is maintained in two nodes in the storage cluster; and the symbolic information is maintained in remaining nodes of the storage cluster.

17. The apparatus of claim 10, wherein the storage node is further configured to acquire a lock on associated tracks on relevant nodes in the storage cluster wherein the locking protocol provides for multiple readers and a single writer.

18. The apparatus of claim 10, wherein the storage node is further configured to:

detect a failure of a node in the storage cluster;

broadcast a failover recovery message to an additional storage node in the storage cluster; and replicate the data from one node in the storage cluster to another node in the storage cluster.

19. The apparatus of claim 10, wherein the storage node is further configured to:

detect a failure of a node in the storage cluster;

broadcast a failover recovery message to an additional node in the storage cluster; and desrage the data front a node in the storage cluster to disk.

20. An article of manufacture, including a computer readable storage medium that tangibly embodies logic to perform a method of maintaining cache in a clustered environment, the method comprising:

(a) receiving an I/O request, for modifying data, in a primary node of a storage cluster of two or more nodes;

(b) storing the modified data in cache of the primary node;

(c) selecting a secondary node for storing the modified data in the secondary node's cache based on a historic point of access list maintained in a cache directory, wherein;

(i) the historic point of access list identifies which node's cache contains which data;

(ii) the historic point of access indicates that an original primary node maintains the data in cache; and (iii) the secondary node selected is the original primary node.

(d) forwarding the modified data and symbolic information to one or more relevant nodes in the storage cluster, wherein the symbolic information identifies the primary and secondary nodes as containing the modified data; and (e) updating the historic point of access list based on the symbolic information.

21. The article of manufacture of claim 20 wherein the request is to write data.

22. The article of manufacture of claim 20 wherein:

the symbolic information includes information relating to the first node; and the historic point of access list is updated by:

listing the first node as the primary node; and listing the secondary node as the secondary node.

23. The article of manufacture of claim 20, the method further comprising selecting a remote node that is an original secondary node in the historic point of access list maintained in the cache directory.

24. The article of manufacture of claim 20 wherein:

a copy of the modified data is maintained in the first node and the secondary node; and the symbolic information is maintained in remaining nodes of the storage cluster.

25. The article of manufacture of claim 20, the method further comprising acquiring a lock on associated tracks on nodes in the storage cluster wherein the locking protocol provides for multiple readers and a single writer.

26. The article of manufacture of claim 20, the method further comprising:

detecting a failure of a node in the storage cluster;

broadcasting a failover recovery message to all nodes in the storage cluster; and replicating the data from the primary node or the secondary node to another node in the storage cluster.

27. The article of manufacture of claim 20, the method further comprising:

detecting a failure of a node in the storage cluster;

broadcasting a failover recovery message to all nodes in the storage cluster; and desraging the data from the primary node or the secondary node to disk.

28. The article of manufacture of claim 20, the method further comprising: applying for cluster admission;

requesting the symbolic information for new write requests;

requesting a modified track list comprising an identifier of modified data and an associated symbolic entry;

merging the modified crack list with any new symbolic entries; and broadcasting availability to remaining nodes in the storage cluster.

* * * * *